(12) United States Patent
Bailor et al.

(10) Patent No.: US 8,161,019 B2
(45) Date of Patent: Apr. 17, 2012

(54) CROSS-CHANNEL COAUTHORING CONSISTENCY

(75) Inventors: Jonathan B. Bailor, Bellevue, WA (US); Christopher J. Antos, Bellevue, WA (US); Ethan J. Bernstein, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 12/433,929

(22) Filed: May 1, 2009

(65) Prior Publication Data

US 2010/0281007 A1 Nov. 4, 2010

(51) Int. Cl.
*G06F 17/00* (2006.01)
(52) U.S. Cl. ......................... 707/704; 709/206
(58) Field of Classification Search .............. 707/704, 707/E17.007; 709/206
See application file for complete search history.

(56) References Cited

U.S. PATENT DOCUMENTS

| | | | |
|---|---|---|---|
| 6,988,270 | B2 | 1/2006 | Banavar |
| 7,103,597 | B2 | 9/2006 | McGoveran |
| 7,480,708 | B2 | 1/2009 | Muehl |
| 2002/0065848 | A1 | 5/2002 | Walker |
| 2003/0105816 | A1 | 6/2003 | Goswami |
| 2005/0222933 | A1 | 10/2005 | Wesby |
| 2006/0101321 | A1 | 5/2006 | Friedrichowitz |
| 2007/0130255 | A1 | 6/2007 | Wolovitz |
| 2008/0140732 | A1 | 6/2008 | Wilson |
| 2008/0177782 | A1 | 7/2008 | Poston |
| 2009/0019048 | A1* | 1/2009 | Pendergast et al. ............... 707/8 |

OTHER PUBLICATIONS

"Perforce 2008.2 Introducing Perforce," Perforce Software, © 2005-2008, 26 pages.

Hofte et al., "Collaborative Compound Document Editing: the CoCoDoc Framework and Its Applications," Sep. 1997, 2 pages.
Qingzhang et al., "The XML-Based Collaborative Documents Model Design," © 2003, 5 pages.
Whitehead, Jr., et al., "WebDAV A Network Protocol for Remote Collaborative Authoring on the Web," accessed at: http://www.ics.uci.edu/~ejw/papers/dav-ecscw.pdf, on Feb. 25, 2009, 21 pages.
Xue et al., "A User-Centred Consistency Model in Real-Time Collaborative Editing Systems," © 2002, pp. 138-150.
U.S. Appl. No. 12/145,536, filed Jun. 25, 2008.
International Search Report and Written Opinion issued in PCT/US2010/033241, mailed Nov. 30, 2010 (Non-M&G 326783-02).

* cited by examiner

*Primary Examiner* — Shahid Alam
*Assistant Examiner* — Jagdish Pandya
(74) *Attorney, Agent, or Firm* — Merchant & Gould P.C.

(57) ABSTRACT

A computing device includes a processing unit, and a memory with instructions that, when executed by the processing unit, cause the processing unit to create: a document processing module that processes the creation and editing of document content; and a metadata processing module that generates, monitors and stores metadata for a document on the computing device, the metadata processing module generating lock creation metadata that include information about a new lock that is created when a user begins to edit a portion of a document, lock removal metadata that includes information about removing a lock, and lock deletion metadata that includes information about deleting a lock, the metadata processing module writing lock creation metadata to both a data channel and to a separate metadata channel, the metadata processing module writing lock removal metadata to the data channel and the metadata processing module writing lock deletion metadata to the metadata channel.

19 Claims, 6 Drawing Sheets

CROSS-CHANNEL COAUTHORING CONSISTENCY

BACKGROUND

Network-based document collaboration systems permit multiple users to simultaneously access and coauthor a document. Although multiple users are permitted to coauthor a document, in order to prevent conflicts, the system may restrict the areas in a document in which each user can make edits. If information associated with these restrictions is not communicated to other coauthoring users, the chances for conflicting changes when the copies of the documents are merged are increased.

SUMMARY

Embodiments of the disclosure are directed to a computing device including a processing unit, and a system memory with instructions that, when executed by the processing unit, cause the processing unit to create: a document processing module that processes the creation and editing of document content; and a metadata processing module that generates, monitors and stores metadata for a document on the computing device, the metadata processing module generating lock creation metadata that include information about a new lock that is created when a user begins to edit a portion of a document, lock removal metadata that includes information about removing a lock, and lock deletion metadata that includes information about deleting a lock, the metadata processing module writing lock creation metadata to both a data channel and to a separate metadata channel, the data channel being a first communication path between the computing device and a server computer along which content and lock metadata associated with the document is communicated, and the metadata channel being a second communication path between the computing device and the server computer along which the lock metadata associated with the document is communicated, the metadata processing module writing lock removal metadata to the data channel and the metadata processing module writing lock deletion metadata to the metadata channel.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for providing cross-channel consistency of information when merging document data in a network-based document collaboration system. In the systems and methods disclosed, metadata, for example locks for areas of the document, is transmitted on a metadata channel and both document content and metadata are transmitted on a data channel. The systems and methods disclose prioritization rules that specify when the metadata should be properly applied to the document.

Figure 1:
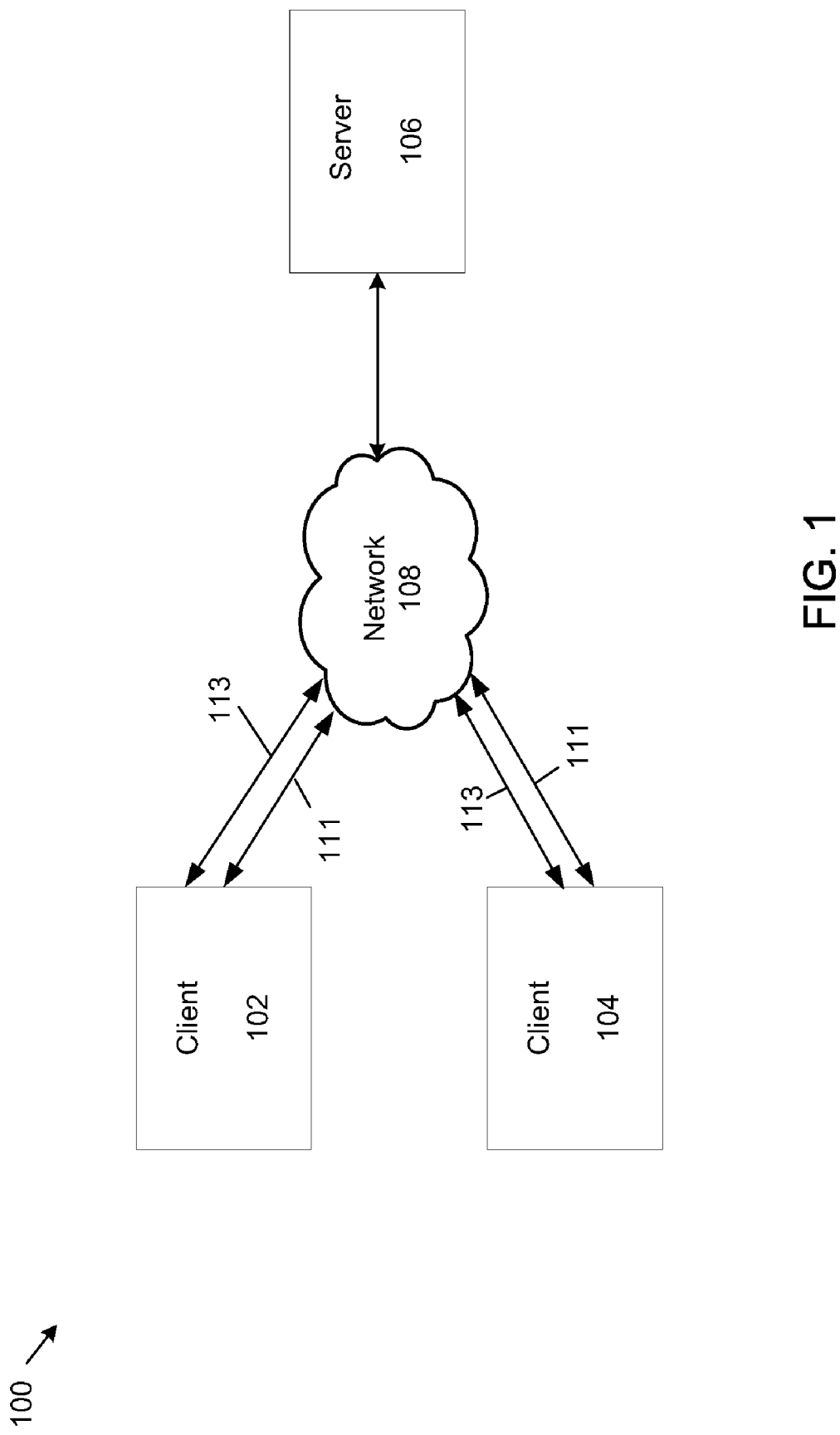
FIG. 1 shows an example system for cross-channel coauthoring consistency.

FIG. 1 shows an example system 100 that supports cross-channel consistency when applying metadata to documents. The system 100 includes clients 102, 104, a server 106 and a network 108. More or fewer clients and servers can be used. In this disclosure, the terms client and client computer are used interchangeably, and the terms server and server computer are used interchangeably.

Among the plurality of information stored on the clients 102, 104 is a client operating system ("OS") and client applications. The client OS is a program that manages the hardware and software resources of the client system. The client applications utilize the resources of the clients 102, 104 to directly perform tasks specified by the user. For example, the clients 102, 104 include one or more software applications, such as word processing programs, that are used to create and edit document files. One example of such an application is Microsoft Word from Microsoft Corporation of Redmond, Wash. Other examples of such applications are also applicable.

Server 106 is a file server that is accessible through a network. Server 106 stores a plurality of files. These files can include both software applications and documents, as described further herein. Server 106 controls access to the documents stored by the server 106.

In example embodiments, the server 106 can be located within an organization or can be part of a document collaboration system. An example document collaboration system is a SHAREPOINT® team services portal server services provided by Microsoft Corporation. An example shared document server is Microsoft Office SharePoint Server 2007 provided by Microsoft Corporation. Other configurations can be used.

Metadata is information about data. Some examples of typical metadata are a document name, date of creation or last edit, authors currently editing the document, authors currently reviewing the document, paragraph identifiers and paragraph locks. Other kinds of document metadata are possible. In this disclosure, metadata includes locks applied to areas of a document to prevent multiple coauthoring users from simultaneously editing the same area of the document. The document area is typically a paragraph, but it may include paragraph headings, tables, sentences, etc. The metadata includes metadata to create a lock, metadata to remove a lock and metadata to delete a lock.

In example embodiments, metadata is transmitted through a metadata channel 111. In example embodiments, to provide cross-channel consistency, metadata is also transmitted on a data channel 113. The data channel 113 is also used to send document content information to and from server computer 106.

Metadata to create a lock, referred to as lock creation metadata, is written to metadata channel 111 when a coauthoring user modifies the content of an area of the document, for example by typing in a paragraph or by making a formatting change. The lock creation metadata applies a lock to the paragraph for all other coauthoring users, preventing other coauthoring users from editing the same area of the document. As discussed further below, in order to provide cross-channel consistency, lock creation metadata is also included in the data channel 113 when a document is saved.

Metadata to remove a lock, referred to as lock removal metadata, is written to the data channel 113 when a coauthoring user has finished editing an area of a document, typically a paragraph. The lock removal metadata is written to data channel 113 to synchronize the lock removal with a content update. When a coauthoring user finishes editing an area of a document, the coauthoring user typically performs a save operation. During a save operation, document content is written to the data channel 113 and sent to server 106. The writing of the lock removal metadata to the data channel 113 along with the document content ensures that the metadata to remove the lock for the edited area of the document is received at the same time as the document content. This prevents the potential problem of having a lock removed before updated content is received, potentially allowing a user to edit an area of a document that does not have the most up-to-date content.

Metadata to delete a lock, referred to as lock deletion metadata, is written to the metadata channel 111 when a lock is explicitly deleted, for example by activating a lock deletion button or by means of a timeout. A lock may be explicitly deleted for a number of reasons. For example, a user may start editing an area of a document, creating a lock for that area of the document, and then cancel without saving. Without an explicit method of deleting the lock, the lock would still be in effect. As another example, a user may start editing an area of a document, creating a lock for that area of the document, and walk away for a long period of time, or be disconnected from the network 108 for a long period of time. For these cases, the document collaboration system may implement a timeout that causes all locks for a coauthoring user to expire after a specific time. For this example, the timeout causes lock deletion metadata to be written to metadata channel 111 for the areas of the document being edited.

Each unit of lock metadata has an identifier associated with it. In this example, the identifier includes a number that identifies the lock and that also identifies the section of the document for which the lock is directed, as described further below. The lock may also include an identifier for the user that initiated the creation, removal or deletion of the lock. An identifier is assigned to a lock when the lock is created and the same identifier is used when the lock is deleted or removed. Thus, there is always a lock creation, lock deletion/removal pair associated with a lock.

If an area of a document is being edited, causing the creation of a lock, and a save operation is performed, causing the lock to be removed, and then the same area of the document is edited again, a new lock is created for the area of the document. The new lock is assigned a new identifier, even though the same section of the document is being edited. As explained below, the lock identifier is used as an additional means to enhance cross-channel consistency.

The example document collaboration system maintains a history of each lock creation, lock deletion and lock removal. The history is maintained in the metadata channel 111. As explained further below, the lock creation, lock deletion and lock removal history is used as a further means to enhance cross-channel consistency.

Figure 2:
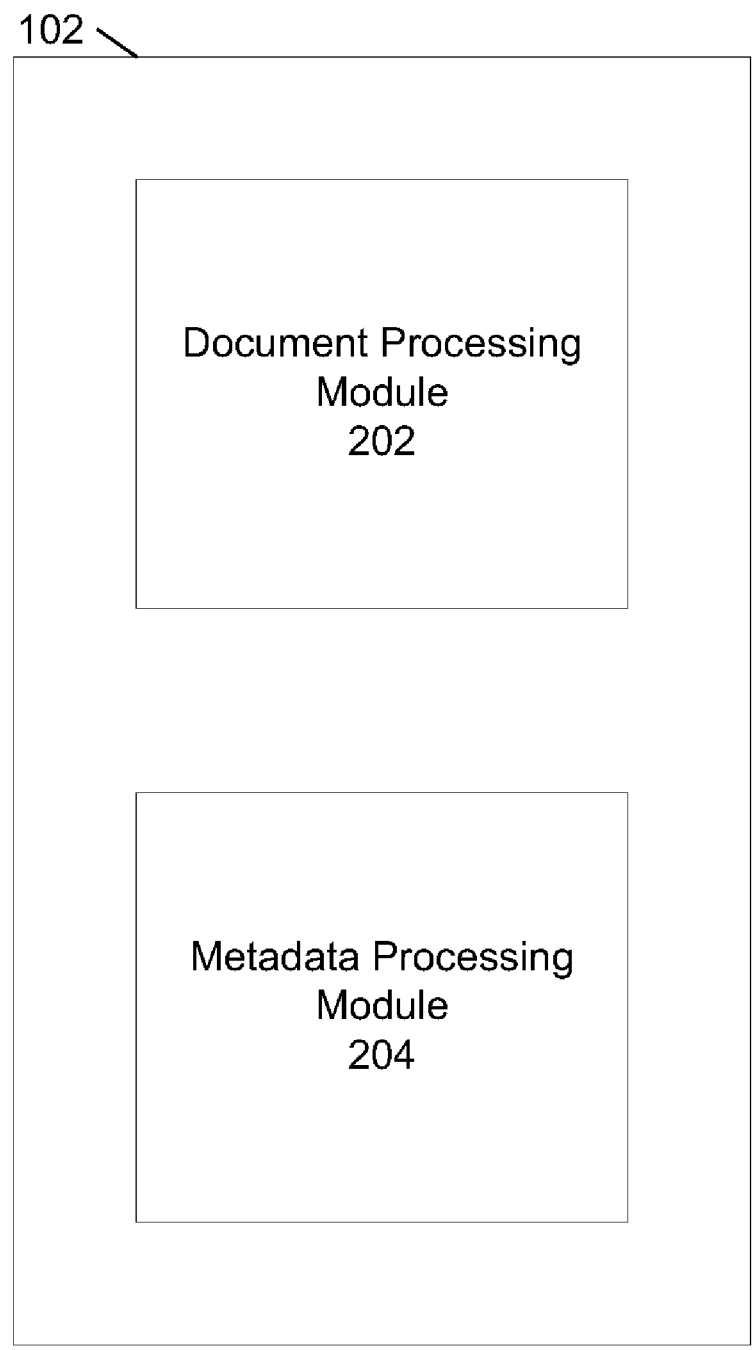
FIG. 2 shows example modules of an example client computer of FIG. 1 that implements a capability for cross-channel coauthoring consistency.

FIG. 2 shows a detailed view of the logical modules of client computer 102. Client computer 102 includes example document processing module 202 and example metadata processing module 204.

The example document processing module 202 performs the operations of a word processor, such as Microsoft Word. The example document processing module 202 permits documents to be created or opened, modified and saved. The example document processing module 202 uses the data channel 113 to save document contents to server 106. The data channel 113 is a relatively slow channel because when a document is saved, the contents of the entire document are sent to the server 106.

In example embodiments, coauthoring users on clients 102 and 104 can edit the same document. If a coauthoring user on client 102 opens the document first, the example document processing module 202 obtains a copy of the document from server 106 and opens the document on client 102. When the coauthoring user on client 104 opens the document, the example document processing module 202 obtains a copy of the document from server 106 and opens the document on client 104. If the coauthoring user on client 102 makes changes to the document before the coauthoring user on client 104 opens the document, but the coauthoring user on client 102 does not save the changes, the coauthoring user on client 104 does not see the changes when the coauthoring user on client 104 opens the document.

In example embodiments, a second coauthoring user does not see changes a first coauthoring user makes to a document until both the first and second coauthoring users save changes to the document. For example, when the coauthoring user on client 102 saves changes to the document opened on client 102, the coauthoring user on client 104 does not see the changes until the coauthoring user on client 104 saves changes to the document opened on client 104. When the coauthoring user on client 104 saves changes to the document opened on client 104 after the coauthoring user on client 102 saves changes to the document on client 102, the changes to the document make on client 102 are merged with the document opened on client 104.

The example metadata processing module 204 processes metadata for documents opened on the example document collaboration system. When a coauthoring user on client 102 opens a document and modifies content in the document, for example by typing in a paragraph of the document, the example metadata processing module on client 102 creates a lock for the paragraph. The lock is metadata that includes a paragraph identifier that identifies the paragraph of the document being locked. The lock metadata also includes an identifier for the coauthoring user editing the document and the lock metadata includes an identifier for the lock.

Additional details regarding paragraph locks can be found in U.S. patent application Ser. No. 12/145,536 filed on Jun. 25, 2008, the entirety of which is hereby incorporated by reference.

In example embodiments, every lock has a lock identifier that identifies the lock. The lock identifier is a random number generated by the example metadata processing module 204 that creates the lock. Each time a new lock is created, even if the new lock is created for the same paragraph as for a previous lock, a new lock identifier is generated for the lock. The lock identifier is used to determine when a lock should be applied, removed or deleted from a document.

When a lock is created, the lock is written to example metadata channel 111 and sent to server computer 106. The metadata channel 111 is a fast channel, separate from the data channel 113. The metadata channel 111 is typically updated more quickly ("fast") as compared to the data channel 113 because there is typically less information to transmit on the metadata channel 111 so the information is transmitted to server 106 faster than information on the data channel 113. It can be beneficial to use the metadata channel 111 for lock propagation to alert coauthoring users quickly that another coauthoring user is editing an area of the document and to minimize the possibility of other coauthoring users from editing the same area of the document.

In example embodiments, initial metadata on the example metadata channel 111 is immediately sent to server 106, but thereafter, additional metadata is sent to server 106 at periodic intervals, for example every 5 second, 10, seconds, 30 seconds, 45 seconds, 1 minute, 5 minutes, or 10 minutes. The additional metadata is sent to server 106 periodically, rather than immediately, for performance reasons, for example to reduce the load on server 106. When the coauthoring editor on client 102 starts editing, for example in paragraph 1 of the document open at client 102, a lock is created for paragraph 1 and sent to server 106 on metadata channel 111. When the lock is received at client 104, the lock prevents a coauthoring user on client 104 from editing in paragraph 1 of the document.

If the coauthoring user on example client 102 now edits paragraph 8, a lock is created for paragraph 8, but the lock isn't sent to server 106 on metadata channel 111 until the periodic time interval expires. For example, if the periodic time interval is 30 seconds and the coauthoring user on client 102 types in paragraph 8 three seconds after the lock for paragraph 1 is sent to server 106, the lock for paragraph 8 is not sent to server 106 on metadata channel 111 for another 27 seconds. In this example, if the coauthoring user on client 102 performs a save operation before the 27 seconds has expired, it is possible for content information for paragraph 8 to arrive at client 104 before the lock for paragraph 8 arrives on metadata channel 111.

For this reason, when the example metadata processing module 204 creates a lock for a paragraph and writes the lock to the metadata channel 111, the example metadata processing module 204 also writes the lock to the data channel 113. Then, when the coauthoring user on client 102 performs a save operation for the edits being made to the document opened on client 102, the lock for the paragraph is transmitted to server 106 on data channel 113 at the same time as content changes for the paragraph are transmitted to server 106 on data channel 113.

Providing lock creation metadata on both metadata channel 111 and data channel 113 helps to minimize any issues of latency associated with the periodic nature of the updates on the metadata channel 111 described above. If the lock on metadata channel 111 arrives at client 104 before the save operation, the lock prevents the coauthoring user on client 104 from editing the paragraph. If a save operation is done on client 102 and the content changes on data channel 113 from the save operation arrive on client 104 before the lock on metadata channel 111, the lock from the data channel 113 arrives at client 104 along with the content changes. The lock in the data channel 113 prevents the coauthoring user on client 104 from editing the paragraph.

Lock removal occurs via data channel 113, typically as a result of a save operation. In a document collaboration system there can be at least two different types of save operations. In one example of a save operation, content data is saved to server 106 but the content information is not designated for sharing. In this example, a coauthoring user saves edited content in order to preserve the content on server 106, but the content may not yet be in a state where the coauthoring user feels comfortable sharing the content with others. In another example of a save operation, the coauthoring user designates the content for sharing. In this disclosure, a save operation is consistent with the second example, meaning that the save operation designates saved content for sharing with other coauthoring users.

Lock removal occurs via data channel 113 because a save operation typically indicates that a coauthoring user has finished editing the paragraphs of the document being saved. If the coauthoring user wishes to continue editing one or more paragraphs, a new lock having a new lock identifier is created for each paragraph that the coauthoring user edits.

Lock removal metadata is written to data channel 113 to ensure that the lock removal metadata is received at server 106 at the same time as the content changes. This ensures that when another coauthoring user, for example a coauthoring user on example client 104, receives the lock removal metadata, permitting the coauthoring user on client 104 to edit the paragraph being locked, the document opened on client 104 is also updated to the latest content. This ensures that, when the lock corresponding the lock removal metadata is removed, the coauthoring user on client 104 edits the updated content.

When a lock removal occurs, in addition to writing lock removal metadata to data channel 113, the lock removal metadata is also written to metadata channel 111. Lock removal metadata from metadata channel 111 typically arrives at server 106 before lock removal metadata from data channel 113 arrives at server 106. When server 106 receives the lock removal metadata, server 106 changes the lock type on the locked paragraph for other coauthoring users of the document. The new lock type indicates that the locked paragraph is no longer being edited. This informs a user, for example a coauthoring user on client 104, that the paragraph is available for editing. However, the paragraph is still locked for the coauthoring user on client 104. When the coauthoring user on client 104 performs a save operation, server 106 updates client 104 with the updated content changes to the paragraph and removes the lock on the paragraph.

Lock deletion metadata is sent to server 106 on the metadata channel 111. Lock deletion metadata is distinguished from lock removal metadata. Lock removal metadata is generated when a user is no longer editing an area of a document. Lock deletion metadata occurs because on an explicit action by a coauthoring user or an explicit action by the document collaboration system. For example, as described above, a user may start editing one or more paragraphs and decide to cancel the edits without saving. Since lock creation metadata is written to both metadata channel 111 and data channel 113 when the coauthoring user types in a paragraph, the coauthoring user can press a delete key associated with the example document processing module 202. Pressing the example delete key causes lock deletion metadata to be written to the metadata channel 111.

As discussed below, lock deletion metadata has a higher priority than lock creation metadata. As result, when the metadata from metadata channel 111 is processed on client 104, the lock deletion metadata removes any locks having the lock identifiers of the lock deletion metadata from the document open on client 104.

Lock deletion metadata is also explicitly generated by the document collaboration system under certain conditions. For example, if a user edits one or more paragraphs of a document, does not save the changes, does not close the document and goes home for the night, locks are still active for all the paragraphs that the user edited. These locks prevent other coauthoring users from editing the paragraphs. The metadata processing module 111 addresses this situation by timing out the locks after a predetermined period of time and generating lock deletion metadata for the locks.

When client 104 receives metadata, for example the metadata generated by client 102, prioritization rules on client 104 determine how the metadata is to be applied to a document open on client 104. When a coauthoring user on client 104 obtains a document from server 106 and opens the document on client 104, metadata is obtained for the document on metadata channel 111. If the metadata includes one or more locks for one or more paragraphs of the document, client 104 determines if the metadata includes one or more lock removals having the same lock identifier as the one or more locks. If the metadata includes a lock removal having the same lock identifier as a lock included in the metadata, the lock is not applied to the document. The reason is that a lock removal always occurs after a lock is created, so the lock removal is more current. However, if the metadata does not include a lock removal having the same lock identifier as a lock included in the metadata, the lock is applied to a paragraph in the document specified in the lock metadata. The lock prevents the coauthoring user on client 104 from editing the document.

Once the document on client 104 is opened and initial metadata is applied to the document as above, in example embodiments additional metadata is applied to document at periodic intervals, typically 30 seconds. In addition, in example embodiments additional content updates to the document are only applied to the document when a save operation is done on client 104. When the next periodic time interval occurs, metadata is obtained from server 106 via metadata channel 111. The metadata is applied to the document according to priority rules. The example metadata processing module 204 on client 104 first determines whether the metadata includes any lock deletions. Lock deletions on metadata channel 111 are the highest priority metadata, indicating that a lock is to be explicitly removed.

The example metadata processing module 204 on client 104 then determines whether the metadata obtained from server 106 includes any lock creations. If the metadata includes one or more lock creations, a determination is made whether the metadata also includes any lock removals that match the lock identifier of the one or more lock creations. If a lock creation does not have a corresponding lock removal with the same lock identifier, a lock corresponding to the lock creation is applied to the paragraph of the document identified in the lock creation. However, if the lock creation does have a corresponding lock removal with the same lock identifier, the lock corresponding to the lock creation is not applied to the paragraph of the document identified in the lock creation. This is because a lock removal always occurs after a lock creation and if the lock removal and the lock creation have the same identifiers, the lock has been cancelled.

When the coauthoring user on client 104 performs a save operation, updated content for the document is obtained from server 106. The updated content reflects any changes to the document made by other coauthoring users that saved their content changes to server 106 since the last save operation on client 104. The updated content is sent from server 106 to client 104 on data channel 113. When client 104 receives the updated content from server 106, client 104 determines whether the latest metadata received from server 106 includes any lock removals. If the latest metadata received from server 106 includes any lock removals, the lock identified by the lock removal is removed from the paragraph of the document identified by the lock removal. The reason a lock removal does not occur until a content update occurs is to ensure that when a lock is removed and a coauthoring user starts editing the paragraph that was locked, the coauthoring user is editing the most recent content for the document that is saved on server 106.

Figure 3:
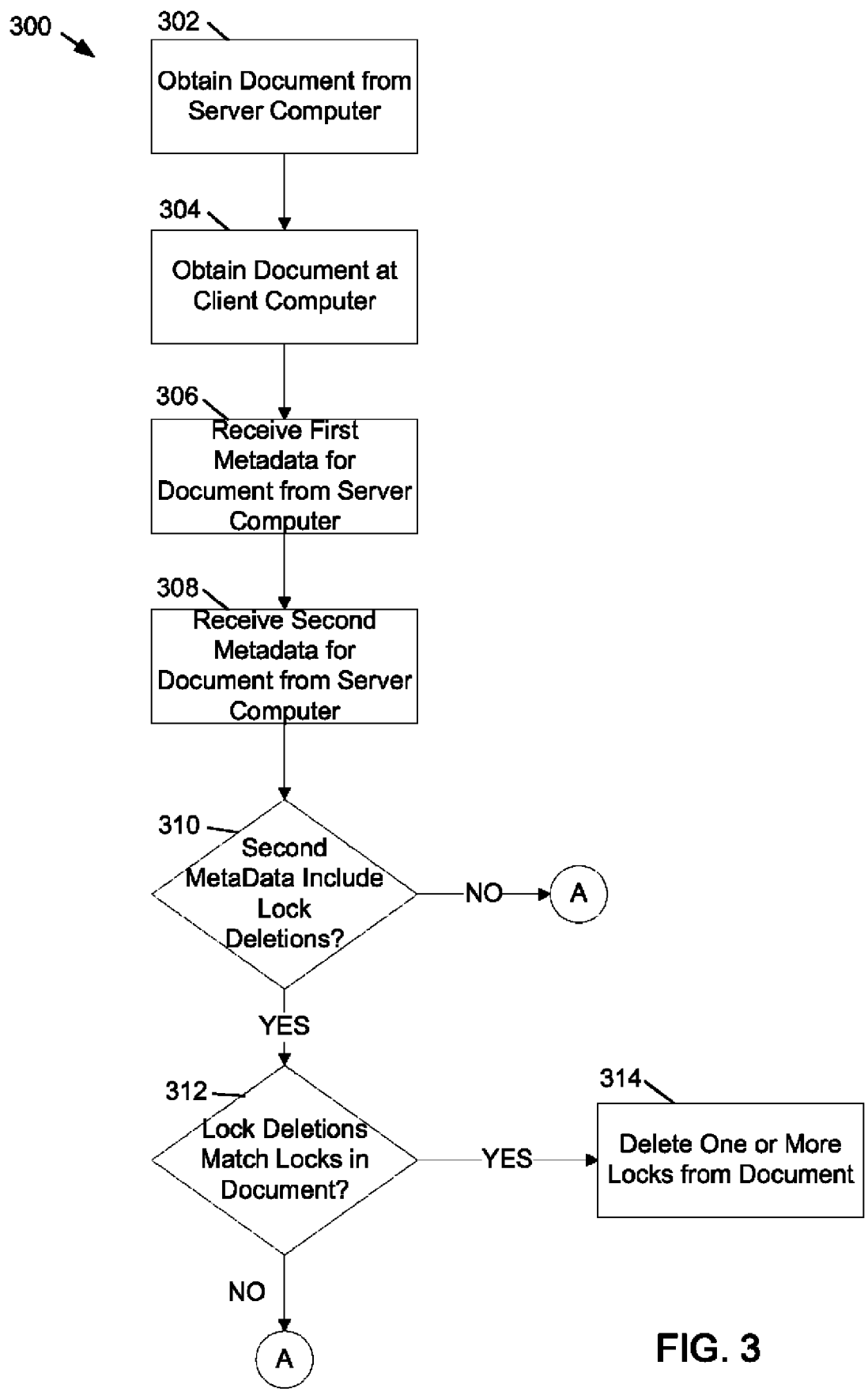
FIG. 3 shows a first portion of a flowchart of a method for applying metadata to a document at a client computer.
Figure 4:
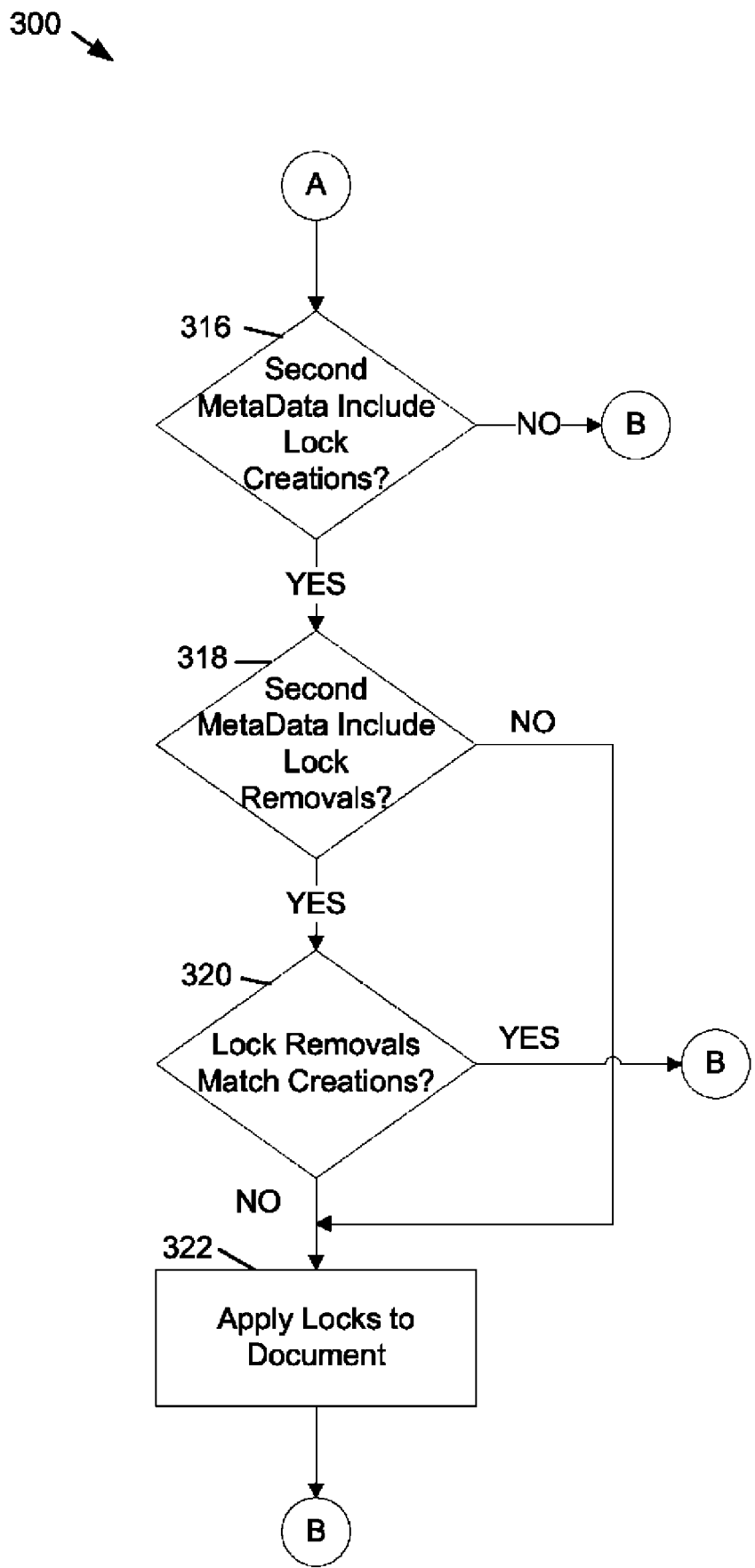
FIG. 4 shows a second portion of a flowchart of a method for applying metadata to a document at a client computer.
Figure 5:
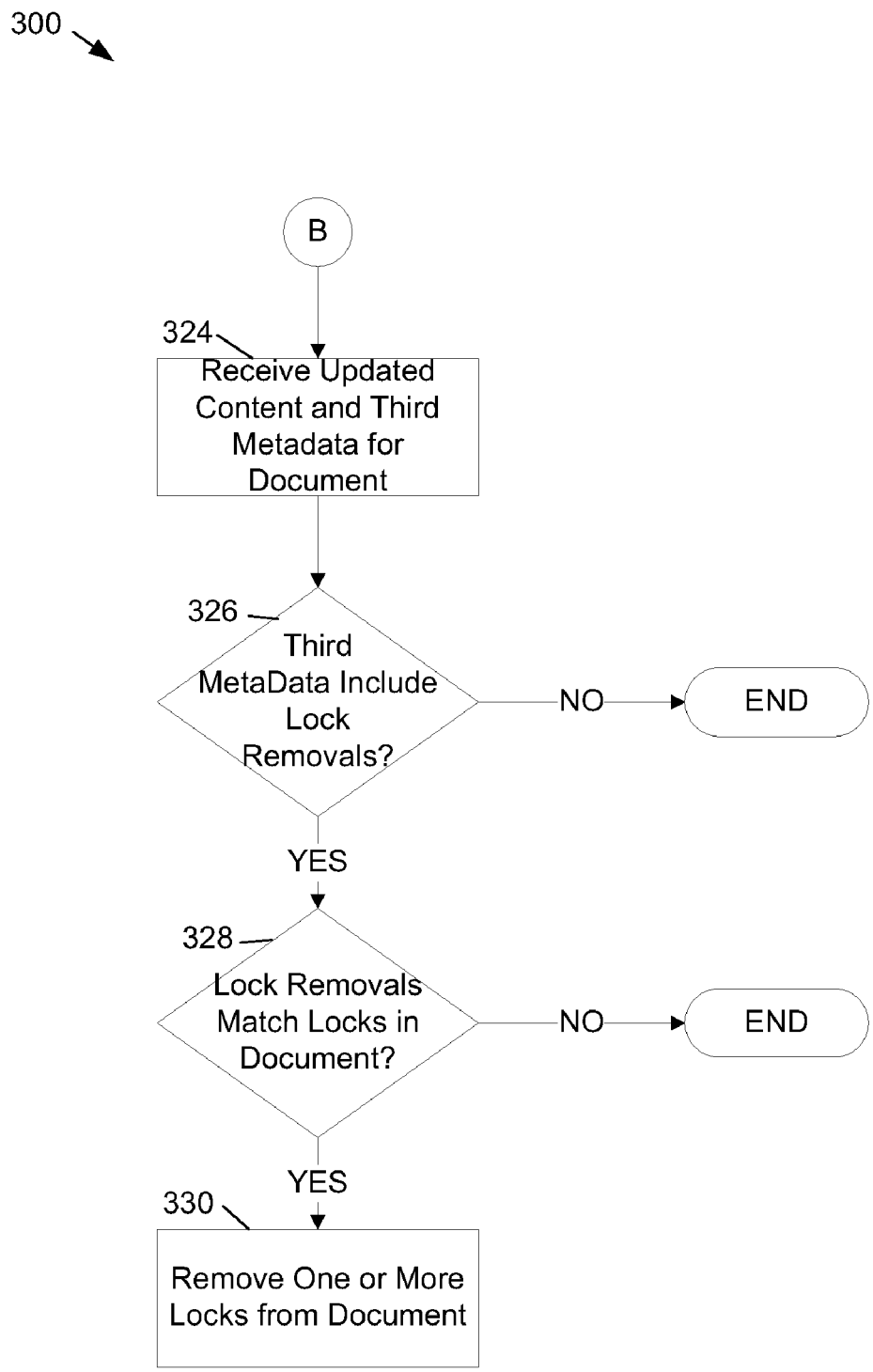
FIG. 5 shows a third portion of a flowchart of a method for applying metadata to a document at a client computer.

FIGS. 3-5 show an example flow chart 300 for a method of applying metadata to a document to provide cross-channel consistency of information. At operation 302 a document designated for coauthoring is obtained from server computer 106. At operation 304 the document is opened by a coauthoring user on client 104. At operation 306, client 104 receives a first message from server computer 106 that includes first metadata for the document. Server computer 106 sends the first metadata to client 104 when the document is opened on client 104. The first metadata is sent on metadata channel 111. The first metadata includes one or more locks for the document. The locks indicate that one or more coauthoring users, for example a coauthoring user on client 102 have modified one or more areas of the document.

At operation 308, client 104 receives a second message from server computer 106 that includes second metadata for the document. The second metadata is also received on metadata channel 111. At operation 310, a determination is made whether the second metadata includes one or more lock deletions. When it is determined that the second metadata includes one or more lock deletions, at operation 312 a determination is made whether the one or more lock deletions match a lock applied to the document. Each lock deletion has an identifier and each lock has an identifier. If a determination is made that an identifier for a lock deletion matches an identifier for a lock on the document, at operation 314, the lock on the document is deleted.

At operation 316, a determination is made whether the second metadata includes lock creations. When it is determined that the second metadata includes lock creations, at operation 318, a determination is made whether the second metadata includes lock removals. When it is determined that the second metadata includes lock removals, at operation 320 a determination is made whether an identifier for a lock removal matches an identifier for a lock creation. When it is determined that there are no lock removals or when it is determined that there are lock removals and none of the lock removals match a lock creation, at operation 322, the locks corresponding to the lock creations in the second metadata are applied to the document. If a lock creation has a matching lock removal, a lock is not applied to the document for the lock creation. Because the lock removal occurs after the lock creation, the lock removal indicates that the area of the document corresponding to the lock creation no longer needs to be locked.

At operation 324, client 104 receives a third message from server computer 206 that includes document content and that includes also includes third metadata. The third message is typically received after the coauthoring user on client 104 performs a save operation to save content for a document opened on client 104. The document content included in the third message is updated document content from another coauthoring user, for example the coauthoring user on client 102. The third message is received on the data channel 113. The third message is received on the data channel 113 to ensure that lock removals are received at the same time as updated document content. This ensures that if a lock is removed, the area of the document for which the lock is removed has the latest content.

At operation 326, a determination is made whether the third metadata includes lock removals. When it is determined that the third metadata includes one or more lock removals, at operation 312 a determination is made whether the one or more lock removals match a lock applied to the document. Each lock removal has an identifier and each lock has an identifier. If a determination is made that an identifier for a lock removal matches an identifier for a lock on the document, at operation 314, the lock on the document is removed.

The above discussion of cross-channel coauthoring consistency describes two coauthoring users. In other example embodiments, more than two coauthoring users may edit the same document. The same metadata merge operations apply for example embodiments having more than two coauthoring users.

Figure 6:
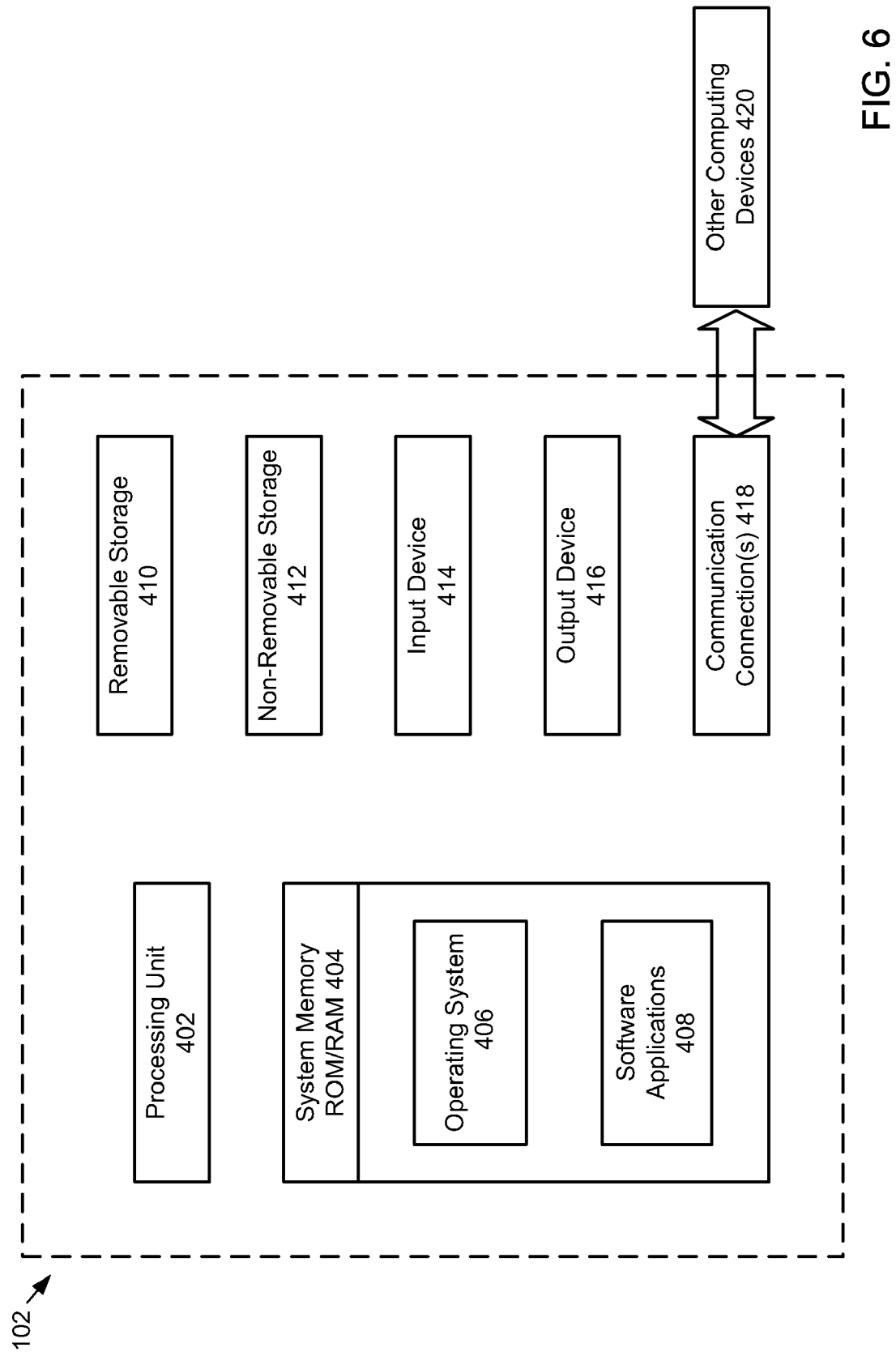
FIG. 6 shows example components of the client computer of FIG. 2.

With reference to FIG. 6, example components of client 102 are shown. In example embodiments, the client 102 is a computing device, such as a desktop computer, laptop computer, personal data assistant, or cellular device. The client 102 can include input/output devices, a central processing unit ("CPU"), a data storage device, and a network device.

In a basic configuration, the computing device 102 typically includes at least one processing unit 402 and system memory 404. Depending on the exact configuration and type of computing device, the system memory 404 may be volatile (such as RAM), non-volatile (such as ROM, flash memory, etc.) or some combination of the two. System memory 404 typically includes an operating system 406 suitable for controlling the operation of a networked personal computer, such as the WINDOWS® operating systems from MICROSOFT CORPORATION of Redmond, Wash. or a server, such as Windows SharePoint Server 2007, also from MICROSOFT CORPORATION of Redmond, Wash. The system memory 404 may also include one or more software applications 408 and may include program data.

The computing device 102 may have additional features or functionality. For example, the computing device 102 may also include additional data storage devices (removable and/or non-removable) such as, for example, magnetic disks, optical disks, or tape. Such additional storage is illustrated in FIG. 6 by removable storage 410 and non-removable storage 412. Computer storage media may include volatile and non-volatile, removable and non-removable media implemented in any method or technology for storage of information, such as computer readable instructions, data structures, program modules, or other data. System memory 404, removable storage 410 and non-removable storage 412 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 102. Any such computer storage media may be part of device 102. Computing device 102 may also have input device(s) 414 such as keyboard, mouse, pen, voice input device, touch input device, etc. Output device(s) 416 such as a display, speakers, printer, etc. may also be included. These devices are well known in the art and need not be discussed at length here.

The computing device 102 may also contain communication connections 418 that allow the device to communicate with other computing devices 420, such as over a network in a distributed computing environment, for example, an intranet or the Internet. Communication connection 418 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments described above are provided by way of illustration only and should not be construed to limiting. Various modifications and changes that may be made to the embodiments described above without departing from the true spirit and scope of the disclosure.

What is claimed is:

1. A method for metadata consistency processing on a client computer, the method comprising:

on a client computer, obtaining a document from a server computer;

opening the document on the client computer;

after opening the document, receiving a first message from the server computer, the first message including first metadata for the document, the first metadata including one or more locks for one or more areas of the document, the first metadata being received from the server computer on a metadata channel, the metadata channel being a first communication path between the client computer and the server computer along which lock metadata associated with the document is communicated;

after opening the document, editing a first area of the document that is not locked;

receiving a second message from the server computer, the second message including second metadata for the document, the second metadata being received on the metadata channel;

after receiving the second metadata, determining whether the second metadata includes one or more lock deletions;

when it is determined that the second metadata includes one or more lock deletions, determining whether the one or more lock deletions include an identifier that matches an identifier for a lock for one or more areas of the document that are locked;

when it is determined that one or more lock deletions include an identifier that matches an identifier for a lock for one or more areas of the document that are locked, deleting the lock corresponding to the lock deletion;

after receiving the second metadata, determining whether the second metadata includes one or more lock creations, each of the one or more lock creations including an identifier corresponding to each lock to be created;

when it is determined that the second metadata includes one or more lock creations, determining whether the second metadata includes one or more lock removals having the same lock identifier as one or more of the lock creations;

when it is determined that the second metadata does not include any lock removals or when it is determined that the second metadata does include one or more lock removals and that none of the one or more lock removals have a lock identifier that matches a lock creation, for each lock creation in the one or more lock creations for which none of the one or more lock removals have a lock identifier that matches the lock creation, applying the lock creation to the area of the document specified in the lock creation;

receiving a third message from the server computer, the third message including content information and third metadata, the content information and the third metadata being received on a data channel that is separate from the metadata channel, the data channel being a second communication path between the client computer and the server computer along which content and the lock metadata associated with the document is communicated;

after receiving the content information and the third metadata, determining whether the third metadata includes one or more lock removals;

when it is determined that the third metadata includes one or more lock removals, determining whether the one or more lock removals include an identifier that matches an identifier for a lock for one or more areas of the document that are locked;

when it is determined that one or more lock removals include an identifier that matches an identifier for a lock for one or more areas of the document that are locked, removing the lock corresponding to the lock removal.

2. The method of claim 1, further comprising:

after determining whether the third metadata includes one or more lock removals, determining whether the third metadata includes one or more lock creations;

when it is determined that the third metadata includes one or more lock creations, determining whether the third metadata includes one or more lock removals having a lock identifier that matches an identifier for one or more of the lock creations; and when it is determined that the third metadata does not include any lock removals or when it is determined that the third metadata does include one or more lock removals and that none of the one or more lock removals have a lock identifier that matches a lock creation, for each lock creation in the one or more lock creations for which none of the one or more lock removals have a lock identifier that matches the lock creation, applying a lock to the area of the document specified in the lock creation.

3. The method of claim 1, further comprising receiving the third message after a save operation is performed at the client computer.

4. The method of claim 1, further comprising the client computer sending a first request message to the server computer at a predetermined interval of time after the client computer receives the first metadata, the first request message requesting metadata from the server computer.

5. The method of claim 4, further comprising receiving the second message from the server computer after the first request message is sent to the server computer.

6. The method of claim 4, further comprising editing a second area of the document that is not locked, the second area of the document being different than the first area of the document.

7. The method of claim 6, further comprising sending a second request message to the server computer, the second request message including a lock creation for the second area of the document that is not locked, the second request message being sent at one or more predetermined intervals of time from the time that the first request message is sent to the server computer.

8. The method of claim 1, further comprising sending fourth metadata to the server computer after editing the area of the document that is not locked, the fourth metadata including a lock creation for the area of the document that is not locked.

9. The method of claim 1, further comprising the first metadata, the second metadata and the third metadata including a history of lock creations, lock removals and lock deletions for the document.

10. The method of claim 1, further comprising the identifiers for each lock creation, each lock removal and each lock deletion including an identifier for a coauthoring user that initiated the lock creation, lock removal or lock deletion.

11. A computing device, comprising:

a processing unit;

a system memory connected to the processing unit, the system memory comprising instructions that, when executed by the processing unit, cause the processing unit to create:

a document processing module that processes the creation and editing of document content; and a metadata processing module that generates, monitors and stores metadata for a document on the computing device, the metadata processing module generating lock creation metadata that include information about a new lock that is created when a user begins to edit a portion of a document, lock removal metadata that includes information about removing a lock, and lock deletion metadata that includes information about deleting a lock, the metadata processing module writing lock creation metadata to both a data channel and to a separate metadata channel, the data channel being a first communication path between the computing device and a server computer along which content and lock metadata associated with the document is communicated, and the metadata channel being a second communication path between the computing device and the server computer along which the lock metadata associated with the document is communicated, the metadata processing module writing lock removal metadata to the data channel and the metadata processing module writing lock deletion metadata to the metadata channel, wherein the metadata processing module assigns an identifier to each of the lock creation metadata, the lock removal metadata and the lock deletion metadata, the metadata processing module assigning identifiers to the lock creation metadata and to the lock removal metadata in pairs, the identifier for at least one lock removal metadata being the same as the identifier for at least one lock creation metadata, not more than one lock creation metadata and one lock removal metadata having a same identifier.

12. The computing device of claim 11, wherein the metadata processing module writes lock removal metadata to the data channel after a save operation, the lock removal metadata corresponding to modified content that is saved during the save operation.

13. The computing device of claim 11, wherein the metadata processing module writes lock creation metadata to the metadata channel and to the data channel when one or more areas of the document are modified.

14. The computing device of claim 11, wherein the metadata processing module writes lock deletion metadata to the metadata channel after a timeout on the computing device or when a delete function is manually activated on the computing device.

15. The computing device of claim 11, wherein the document processing module obtains updated content information for a document from a server computer when a save operation is performed at the computing device.

16. The computing device of claim 15, wherein the metadata processing module obtains lock creation metadata and lock removal metadata from the server computer when the save operation is performed at the computing device.

17. The computing device of claim 16, wherein the metadata processing module obtains lock creation metadata and lock deletion metadata from the server computer at periodic time intervals.

18. The computing device of claim 11, the metadata processing module assigns identifiers to the lock creation metadata and to the lock deletion metadata in pairs, the identifier for at least one lock deletion metadata being the same as the identifier for at least one lock creation metadata, not more than one lock creation metadata and one lock deletion metadata having the same identifier.

19. A computer-readable data storage medium comprising instructions that, when executed by a processing unit of an electronic computing device, cause the processing unit to:

obtain a document from a server computer, the document being requested by a user at the electronic computer device;

open the document;

after opening the document, receive a first message from the server computer, the first message including first metadata for the document, the first metadata including one or more locks for one or more areas of the document, the first metadata being received from the server computer on a metadata channel, the metadata channel being a first communication path between the electronic computing device and the server computer along which lock metadata associated with the document is communicated;

after opening the document, edit a first area of the document that is not locked;

receive a second message from the server computer, the second message including second metadata for the document, the second metadata being received on the metadata channel;

after receiving the second metadata, determining whether the second metadata includes one or more lock deletions;

when it is determined that the second metadata includes one or more lock deletions, determining whether the one or more lock deletions include an identifier that matches an identifier for a lock for one or more areas of the document that are locked;

when it is determined that one or more lock deletions include an identifier that matches an identifier for a lock for one or more areas of the document that are locked, deleting the lock corresponding to the lock deletion;

after receiving the second metadata, determine whether the second metadata includes one or more lock creations, each of the one or more lock creations including an identifier corresponding to each lock to be created;

when it is determined that the second metadata includes one or more lock creations, determine whether the second metadata includes one or more lock removals having the same lock identifier as one or more of the lock creations;

when it is determined that the second metadata does not include any lock removals or when it is determined that the second metadata does include one or more lock removals and that none of the one or more lock removals have a lock identifier that matches a lock creation, for each lock creation in the one or more lock creations for which none of the one or more lock removals have a lock identifier that matches the lock creation, apply the lock creation to the area of the document specified in the lock creation;

receive a third message from the server computer, the third message including content information and third metadata, the content information and the third metadata being received on a data channel that is separate from the metadata channel, the data channel being a second communication path between the electronic computing device and the server computer along which content and the lock metadata associated with the document is communicated;

after receiving the content information and the third metadata, determine whether the third metadata includes one or more lock removals;

when it is determined that the third metadata includes one or more lock removals, determine whether the one or more lock removals include an identifier that matches an identifier for a lock for one or more areas of the document that are locked;

when it is determined that one or more lock removals include an identifier that matches an identifier for a lock for one or more areas of the document that are locked, remove the lock corresponding to the lock removal;

after determining whether the third metadata includes one or more lock removals, determine whether the second metadata includes one or more lock creations that have identifiers that match an identifier for the one or more lock removals;

when it is determined that the second metadata includes one or more lock creations that have identifiers that match an identifier for the one or more lock removals, determine whether one or more locks having identifiers that match the one or more lock creations are applied to the document;

when it is determined that one or more lock creations that have identifiers that match an identifier for the one or more lock removals and when it is determined that one or more locks having identifiers that match the one or more lock creations are applied to the document, removing each lock from the document having an identifier that matches a lock creation that has an identifier than matches the one or more lock removals;

after determining whether the third metadata includes one or more lock removals, determine whether the third metadata includes one or more lock creations;

when it is determined that the third metadata includes one or more lock creations, determine whether the third metadata includes one or more lock removals having a lock identifier that matches an identifier for one or more of the lock creations; and when it is determined that the third metadata does not include any lock removals or when it is determined that the third metadata does include one or more lock removals and that none of the one or more lock removals have a lock identifier that matches a lock creation, for each lock creation in the one or more lock creations for which none of the one or more lock removals have a lock identifier that matches the lock creation, applying a lock to the area of the document specified in the lock creation.

* * * * *

UNITED STATES PATENT AND TRADEMARK OFFICE
CERTIFICATE OF CORRECTION

| | | |
|---|---|---|
| PATENT NO. | : 8,161,019 B2 | Page 1 of 1 |
| APPLICATION NO. | : 12/433929 | |
| DATED | : April 17, 2012 | |
| INVENTOR(S) | : Bailor et al. | |

It is certified that error appears in the above-identified patent and that said Letters Patent is hereby corrected as shown below:

In the Claim

Column 14, line 40, Claim 19, delete "than" and insert -- that --, therefor.

Signed and Sealed this
Tenth Day of February, 2015

Michelle K. Lee
*Deputy Director of the United States Patent and Trademark Office*